United States Patent [19]
Larson et al.

[11] Patent Number: 5,701,380
[45] Date of Patent: Dec. 23, 1997

[54] FIBER OPTIC MODULE FOR HIGH DENSITY SUPPLY OF PATCHING AND SPLICING

[75] Inventors: Glen M. Larson, Spokane; Terry R. Mayberry, Veradale, both of Wash.

[73] Assignee: Telect, Inc., Liberty Lake, Wash.

[21] Appl. No.: 669,083

[22] Filed: Jun. 24, 1996

[51] Int. Cl.⁶ .................................................. G02B 6/36
[52] U.S. Cl. ................................... 385/134; 385/135
[58] Field of Search .............................. 385/134, 135, 385/138, 139

[56] References Cited

U.S. PATENT DOCUMENTS

| | | |
|---|---|---|
| 5,093,887 | 3/1992 | Witte .................................... 385/135 |
| 5,127,082 | 6/1992 | Below et al. ......................... 385/135 |
| 5,129,030 | 7/1992 | Petrunia .............................. 385/135 |
| 5,167,001 | 11/1992 | Debortoli et al. .................. 385/135 |
| 5,231,687 | 7/1993 | Handley .............................. 385/135 |
| 5,339,379 | 8/1994 | Kutsch et al. ...................... 385/135 |
| 5,446,822 | 8/1995 | Keith .................................. 385/135 |
| 5,497,444 | 3/1996 | Wheeler ............................... 385/135 |

*Primary Examiner*—John Ngo
*Attorney, Agent, or Firm*—Wells, St. John, Roberts, Gregory & Matkin, P.S.

[57] ABSTRACT

Disclosed is a modular fiber optic cable management system which includes a tray module housing, a plurality of tray modules in slidable relation to the tray module housing and which isolates the fiber optic cables for maintenance and access such that the displacement and disturbance to surrounding fiber cables is minimized. Each tray module including an entrance and an exit through which fiber optic cable may be routed and one to four adapters for connection to fiber optic cables.

14 Claims, 4 Drawing Sheets

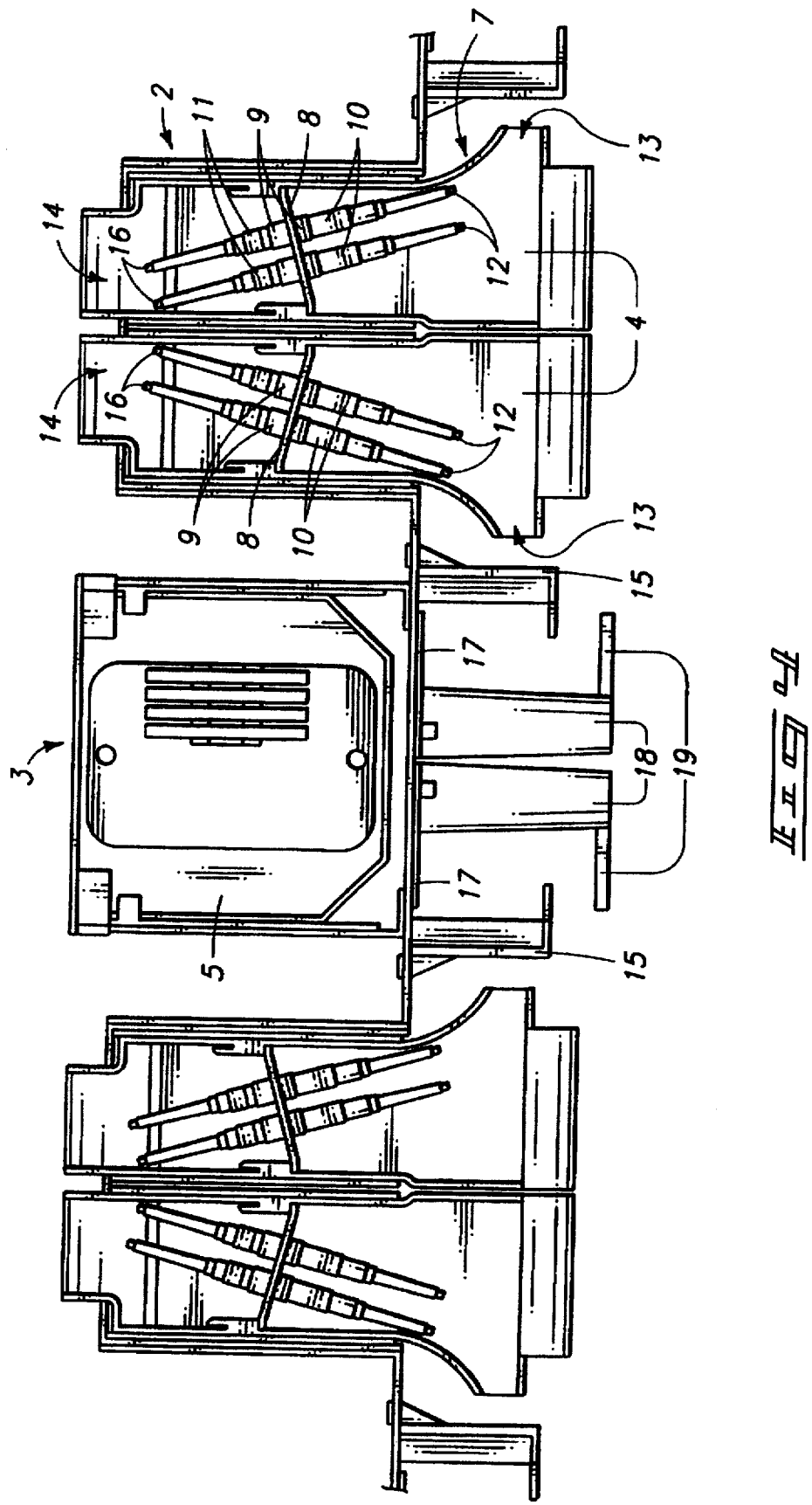

FIBER OPTIC MODULE FOR HIGH DENSITY SUPPLY OF PATCHING AND SPLICING

TECHNICAL FIELD

This invention generally pertains to the telecommunications industry, and more particularly to a fiber distribution frame and fiber cable management system for use in the telecommunications industry.

BACKGROUND OF THE INVENTION

Fiber optic cables are a commonly used means through which to transmit signals in the telecommunications industry. For fiber based telecommunications systems, there are numerous fibers which need to be connected and routed to transmit the appropriate signals and transmissions to their intended destination. The connection and distribution or re-distribution of fiber cables generally occurs at a system location referred to as a fiber distribution frame.

The fiber optic distribution frame systems generally contain connector adapter devices which have two ends, which both connect to a fiber optic connector, thereby operatively joining two fiber optic cables together.

Known fiber optic distribution frame systems include a front and a rear side, with the rear side adapters connected to fiber optic cables which are in turn connected to fiber optic equipment of various types, which often times are located at outside plant locations. The connections on the rear or back side of the frame system are typically made with the intent not to frequently change connections in the rear due to the more difficult access.

On the other hand, the fiber optic adapters on the front side of the fiber optic distribution frame and system generally endure more frequent switching of fiber optic cables and connectors from one adapter to another. The front side connectors and adapters are more typically used for cross connecting incoming signals to other fibers or to other fiber optic equipment.

Due to the tremendous proliferation of the service loads in the telecommunications industry, the existing frame systems and facilities are being maximized by adding more and more capacity to facilitate a higher number of fiber optic lines in the same amount of equipment and floor space, thereby increasing the density of the equipment. This results in fiber cable management becoming more important and more difficult.

The fiber cables are generally comprised of fiber with a concentric cladding, with a protective cover or jacket surrounding the film. The fibers are very sensitive to handling and movement and companies strive to minimize the handling and displacement of the fibers to avoid damaging them. There are inherent problems in bending fibers to a small bending radius, such as cracking, breakage and other related defects. A minimum bending radius of one and one half inches has been a recognized standard below which a fiber cable should not be bent.

When a fiber distribution system must be accessed for any one of numerous reasons, it is most desirable not to displace, move or bend any fibers other than the one or two fibers being accessed. In a typical cassette containing the fiber connectors, there are six or twelve connectors housed in a cassette and therefore when one fiber in the cassette must be accessed, the entire cassette must be removed. This unnecessarily displaces and disturbs the other fiber cables and can result in damage.

The increased fiber cable density on fiber distribution frames and systems have caused the industry to place several fiber adapters in close proximity to one another, creating not only a fiber cable management problem, but also creating a situation where many non-targeted cables must be disturbed and displaced in order to access one of the fiber cables amidst all the others.

The increased system requirements also require that existing floor space in facilities housing fiber distribution frames optimize the density per square foot of floor space. Since existing fiber distribution frames and systems generally require both front and rear access, they necessarily require the precious floor space be left open to the rear of the distribution frame to allow personnel to get behind the frame.

While the increased number of fiber optic cables can be facilitated by merely placing more cables in the same box or housing, this approach creates many service and reliability related problems in that it becomes very difficult to locate the particular fiber that needs to be handled. Still further, in searching for and attempting to isolate the desired fiber in a tightly crammed cluster of fiber, many adjacent and nearby fibers are dislocated and disturbed, causing still further problems.

The uses and applications for fiber optic cable management system panels is also increasing and there is a growing need for such panels and systems which are versatile, and self-supporting or and self-contained. There is a recognized need for such panels in which the housings are free standing, self-supporting or which can be connected to other housings, whereas the existing panels are only designed to fit into or to be integral with a twenty three inch wide by seven feet tall distribution rack.

The lack of versatility of existing panels that span the entire rack width and are designed only to mount to existing racks, is also recognized. While this invention mounts into existing distribution racks, its modularity also allows it to be mounted next to auxiliary modules which service complementary purposes. Similarly and due to the modularity, a tray module housing can be mounted and not take the entire width of a distribution rack. This feature allows the user to only purchase or mount the number of adapters or terminations to meet current capacity, with the ability to later expand capacity by using the remaining available space. This feature further allows the user to mount auxiliary and/or other desired equipment adjacent to the cable management system.

It is an object of this invention to provide a fiber cable distribution frame and system which has the option of allowing complete front access and thereby eliminating the need to maintain floor space behind for rear access. This invention accomplishes this by providing tray modules slidably mounted in a framework or housing, and into which the fiber cable adapters are mounted. The tray modules can be slid out to expose both sides of the fiber cable adapter and the connectors attached to each, thereby eliminating the need to access the rear of the fiber distribution panel to affect changes to the connectors mounted on the rear side of the fiber cable adapters.

It is an object of this invention to provide a fiber cable distribution frame and system which, for purposes of accessing one fiber, minimizes the disturbance and displacement of other fibers. To access an individual fiber connector in prior systems, six to twelve cables must generally be displaced or disturbed. This invention however, isolates individual pairs of fiber cables and therefore only two fiber cables are displaced or disturbed when one is accessed, typically a transmit fiber coupled with a receive fiber.

It is a still further object of this invention to provide a fiber cable distribution frame panel and system which includes an area in which fiber splicers, splitters and other apparatus' can be located and housed in the system.

It is a still further object of this invention to provide a fiber cable distribution frame and system which accomplishes the foregoing while including cable management which maintains the minimum bending radius above one and one half inches. This is accomplished by including minimum radius features at the front and/or rear opening or exits in the tray module through which the fiber cables must pass and by mounting the adapters and hence the connectors at an angle to reduce bending of the fiber.

It is yet another object of this invention to provide such a fiber cable distribution system which is mountable in an industry standard sized frame, as well as others, and in which the standard, interchangeable modules accept industry standard adapters and accept fiber cable splices.

It is still yet another object of this invention to provide such a fiber cable distribution system which simplifies the cable mapping and documentation required to track or map the fiber cables and connections when a cross connect or re-routing is desired.

The typical fiber optic cable distribution frame connects approximately 500 to 700 fiber optic cables, in a standard bay or space, which is a twenty three inch wide, seven foot tall rack. There are other products which will handle up to fourteen hundred fiber cables, however, they suffer from being too difficult to isolate and access fibers, and result in the difficulties related thereto. This invention however allows the achievement of higher density while minimizing the dislocation and disturbance of adjacent and/or nearby fiber cables and while providing desirable and easy cable management.

BRIEF DESCRIPTION OF THE DRAWINGS

Preferred embodiments of the invention are described below with reference to the accompanying drawings, which are briefly described below.

FIG. 4 is a top view of one example of a fiber optic cable management system panel contemplated by the invention, with the top panel of the panel housing removed.

DETAILED DESCRIPTION OF THE PREFERRED EMBODIMENTS

Figure 1:
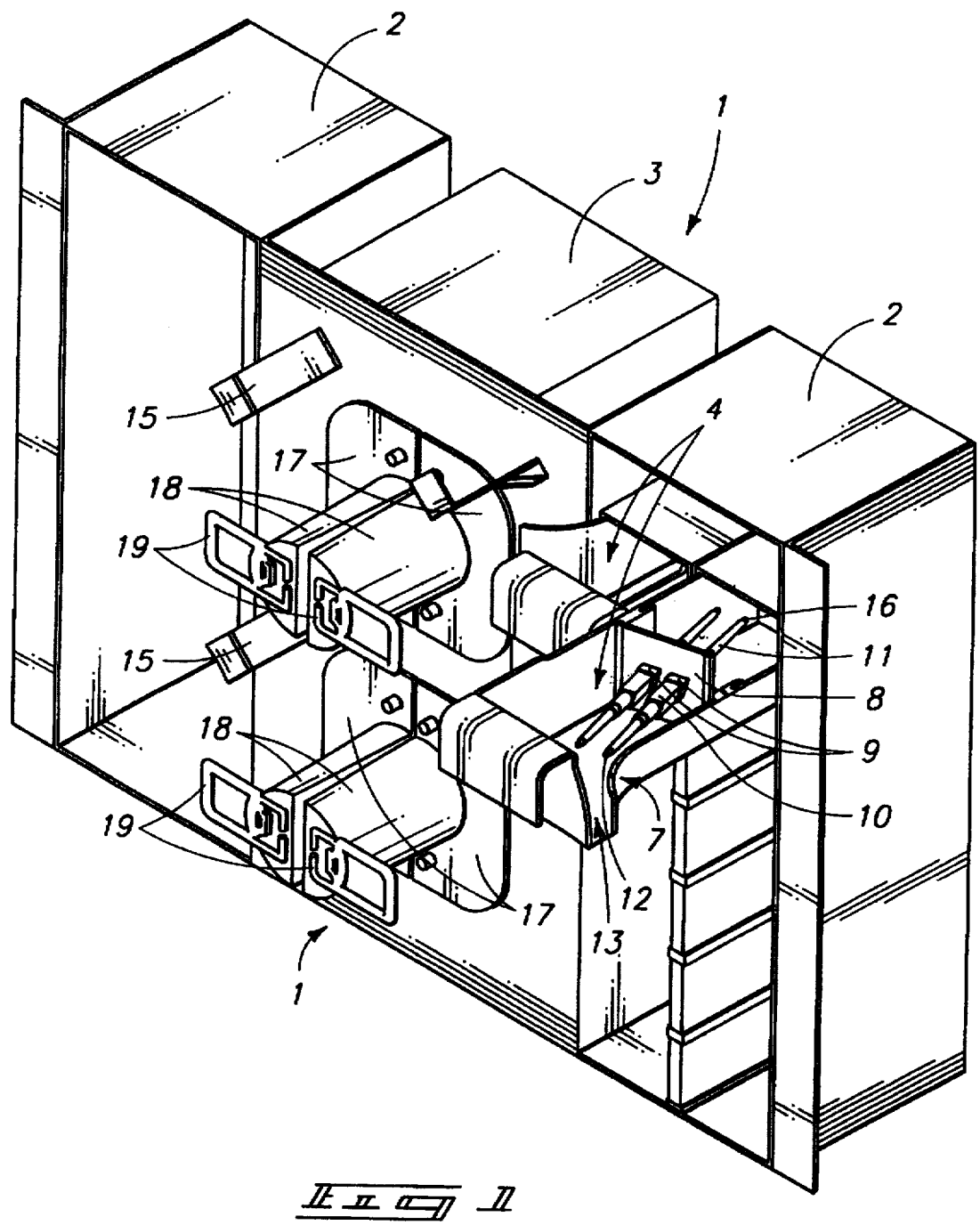
FIG. 1 is a front perspective view of one example of a fiber optic cable management system panel contemplated by the invention.

This disclosure of the invention is submitted in furtherance of the constitutional purposes of the U.S. Patent Laws "to promote the progress of science and useful arts" (Article 1, Section 8).

Many of the fastening, connection and other means and components utilized in this invention are widely known and used in the field of the invention described, their exact nature or type is not necessary for an understanding and use of the invention by a person skilled in the art or science, and they will not therefor be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefor be discussed in significant detail.

This invention is directed to a high density fiber optic modular cable management system wherein the basic framework is modular can be used for several different applications and in multiple configurations.

While a standard sized distribution panel or rack is twenty three inches wide and seven feet tall, there are several other applications wherein more compact sizes are necessary, or remote applications wherein the connectors needs to be placed up against a wall.

Furthermore, one tray module housing can be stacked on another in addition to being placed side by side and a modular panel system thereby built in similar fashion to building blocks.

The term "tray", as used herein, is used in a much broader sense than its dictionary definition. While the preferred embodiment described herein may only show what is traditionally referred to as a tray, for purposes of this invention and the interpretation of "tray" as used herein, tray shall mean any platform, shelf, drawer, mounting surface or other frame, of any shape, and to which the fiber adapters can be mounted and then slid in and out of the tray module housing.

Similarly, the term "housing" as used herein is also used in a much broader sense than its dictionary definition, and refers not only to a housing, but also shall mean a framework, shelf, drawer or other similar structure which supports the plurality of tray modules, allowing the tray modules to be slid in and out of the housing.

The tray module housing in this invention may be constructed or used in different sizes, however, a five inch wide, nine inch tall and five inch deep housing provides flexibility to optimized density in a standard rack and in other applications. While higher densities can be achieved by sizing and configuration changes, the dimensions stated above would allow the number of fiber optic cables which can be handled in a typical distribution rack to be approximately one thousand one hundred and fifty two.

The tray module is in slidable relation to the tray module housing, and depending on the specific configuration, may need to slide up to eight inches or more to sufficiently expose the adapter and connectors.

The fiber cable density can be considered in terms of the number of fiber cable terminations provided per square inch. In the example given in which the frontage of the panel is five inches by nine inches, there would be forty five square inches of frontage area. If there are eighteen tray modules, each with a transmit and a receive fiber optic termination, that makes thirty-six terminations in a forty five square inch area, or eighty terminations per one hundred square inches (0.80 terminations per square inch density).

FIG. 1 is a front perspective view of one example of a fiber optic cable management system panel framework 1 contemplated by this invention. FIG. 1 illustrates a fiber cable management panel framework 1 with a tray module housing 2 connected to an auxiliary module housing 3, which in turn is connected to another tray module housing 2, thereby forming a fiber optic cable management system panel framework 1.

An individual tray module 4 is shown mounted in the tray module housing 2, in an extended position, i.e. slid out of the tray module housing 2 for access to the fiber adapter mount 8, a front connector 10 or a rear connector 11. The fiber optic cable 12 utilizes connector 10 to connect to adapter 9, which is also connected at its opposite end to connector 11 for fiber optic cable 16.

There are various types of adapters which are available and which can be mounted within the tray module 4 within the scope of the invention, with no one in particular being required to practice the invention. Examples of such adapters are SC adapters, FC adapters, D4 and ST adapters, which are each well known and referred to as such in the telecommunications industry. An SC adapter for instance is sized to receive and retain an SC connector at each of its opposite ends such that the adapter joins and optically couples the front connector 10 to the rear connector 11.

Typically, within each tray module 4 will be both a receive connector and adapter assembly and a transmit connector and adapter assembly, with the exception of non-interactive video related applications, wherein both are not typically needed.

The front tray module opening 13 can be an entrance or an exit location through which to route fiber cable, and assures that minimum bending radius standards are met by including an arcuate corner 7 which meets or exceeds the industry standard minimum one and one-half inch bending radius. The rear tray module opening 14, can also be an entrance or an exit location through which to route fiber cable, and which facilitates the routing of cable through the rear of the panel for further connection to other equipment.

Mounted to the fiber cable management panel framework 1 are cable wrap posts 18 with cable retainers 19 or gates mounted on the cable wrap posts 18 via cable wrap post mounts 17. The cable wrap posts 18 can be used for various functions, including the wrapping of fiber cable or the storage of fiber cable. Further cable retainers 15 are provided for additional cable management.

Figure 2:
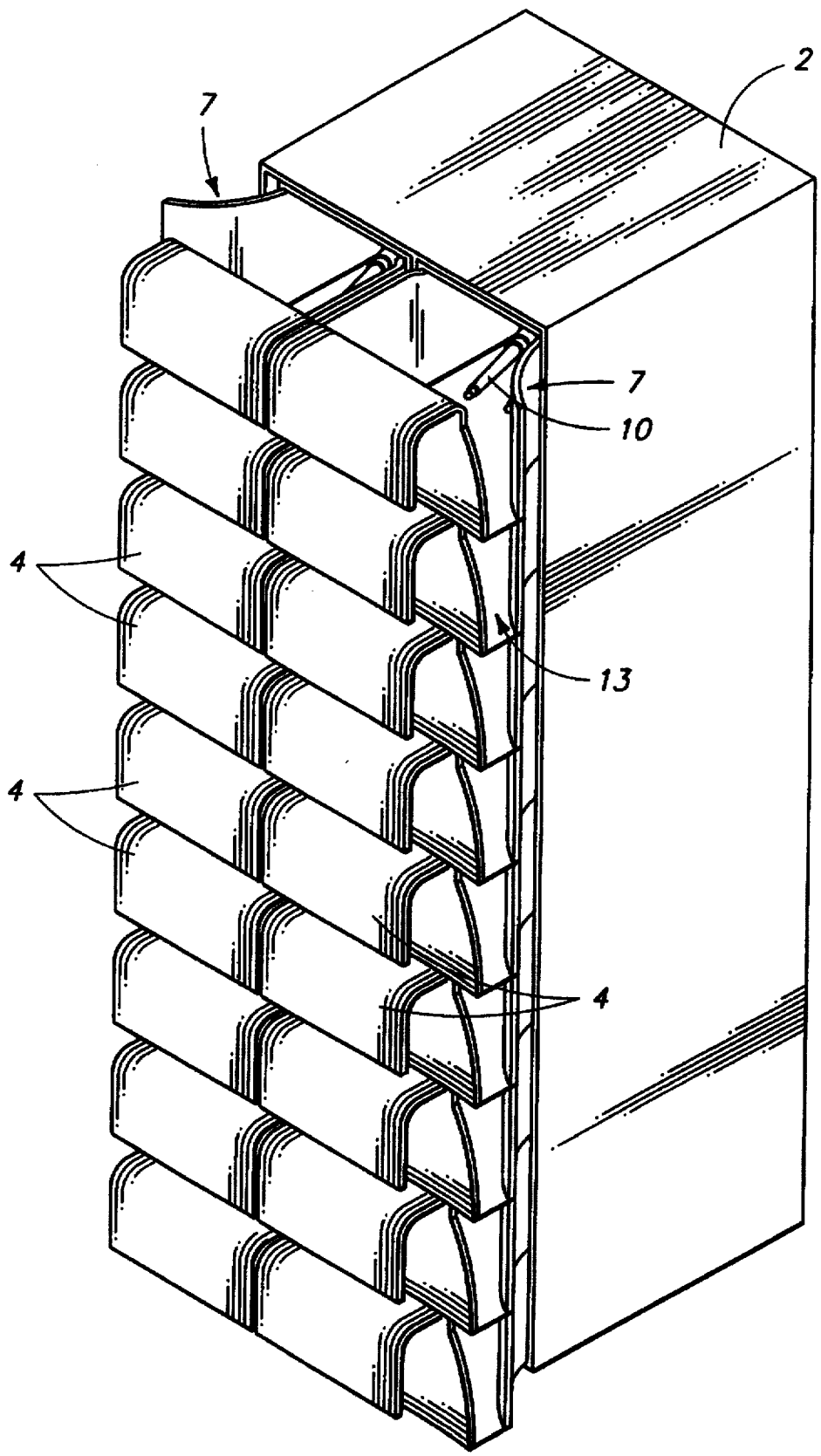
FIG. 2 is a front perspective view of one example of a tray module housing with a plurality of tray modules slidably mounted therein.

FIG. 2 shows eighteen individual tray modules 4 mounted in the tray module housing 2, in the fully retracted position, i.e. inset within the tray module housing 2. If each of the tray modules 4 shown includes two mounted fiber adapters, the tray modules contained in one of the tray module housings contains thirty-six fiber optic adapters to connect to.

Figure 3:
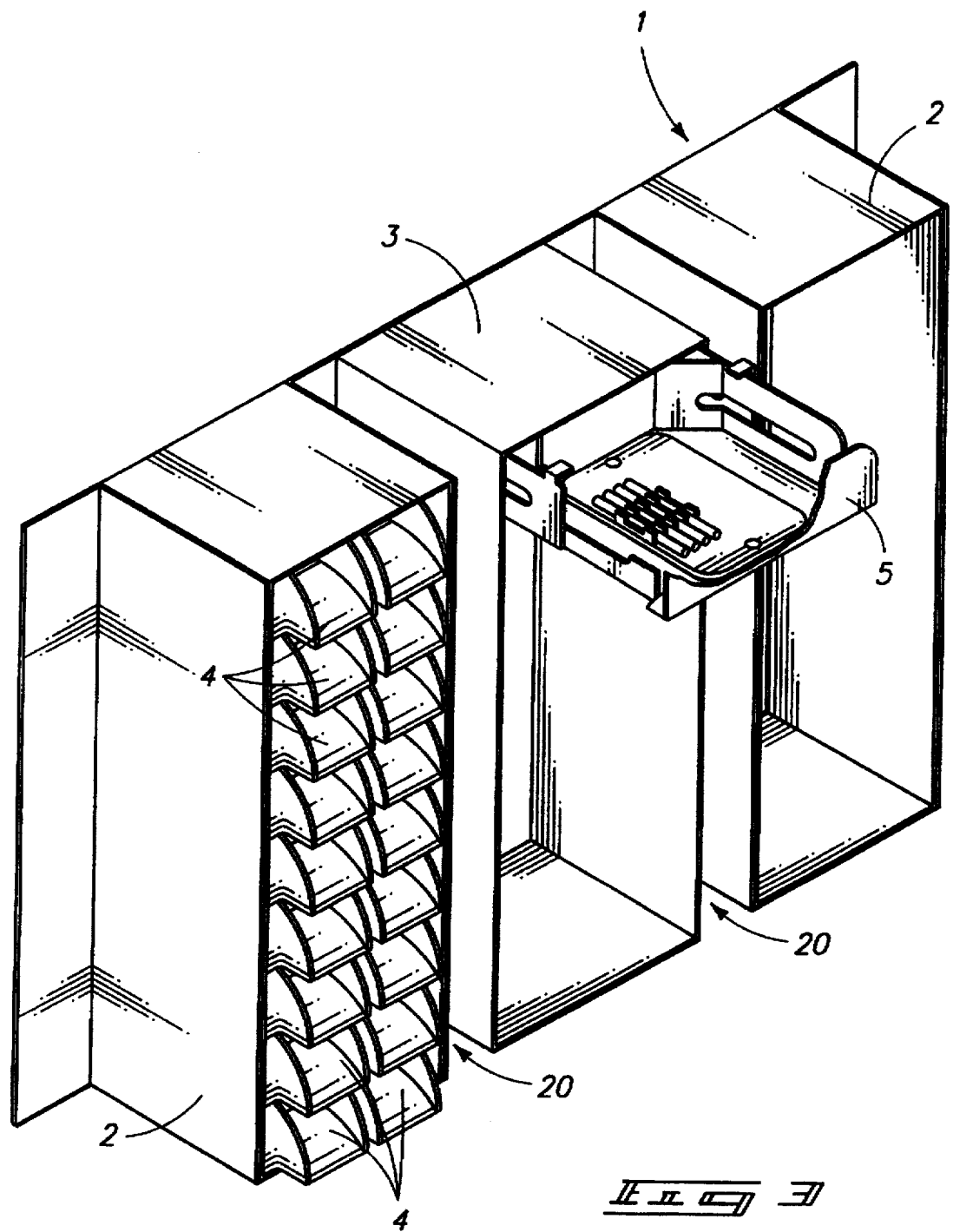
FIG. 3 is a rear perspective view of one example of a fiber optic cable management system panel contemplated by the invention.

FIG. 3 shows a rear perspective view of one example of a fiber optic cable management system panel contemplated by the invention. FIG. 3 illustrates a fiber cable management panel framework 1 connecting a tray module housing 2 to another tray module housing, except the other housing in FIG. 3 will be referred to as an auxiliary module housing 3. The auxiliary module housing 3 shows the versatility of the housing utilized for the tray module housing 2, in that it can similarly serve as the housing for splicing, wave division multiplexers (WDM's) in addition to patching connectors.

FIG. 3 further shows an auxiliary module housing 3 attached to the panel framework, to which the tray module housings 2 are also attached.

FIG. 3 only shows one auxiliary tray module 5 as it is rearwardly slid out from within the auxiliary module housing 3 and in the configuration where it slides out to the rear. The auxiliary tray modules 5 can be used for several different purposes, examples of which are, without limitation: to house fiber cable or necessary slack in fiber cable; coiled or excess fiber cable; wave division multiplexers (WDM's); and in which to mount fiber cable splitters.

It should be noted that although the auxiliary tray module 5 is shown slid out to the rear, this invention also contemplates that the auxiliary tray module 5 be slid out from the front of the auxiliary tray module housing 3. FIG. 3 shows the auxiliary tray module 5 to span the entire width of the auxiliary module housing 3, however, it is within the contemplation of this invention that a tray module configuration used for patching, as shown in FIG. 1, can also be used for auxiliary functions such as splicing. In such a case, the splicing or other auxiliary attachments would be attached or mounted to the tray module and in slidable relation to the auxiliary tray module housing 3.

An alternative configuration within the contemplation of this invention is to attach two or more tray module housings 2 together to maximize the number of fiber optic cables or terminations that can be handled within given space requirements. Those two tray module housings 2 can then be attached to two or more, which can likewise be stacked onto tray module housings 2 or auxiliary module housings 3 beneath them, analogous to building blocks.

There are gaps 20 between the auxiliary module housing 3 and the tray module housings 2 on the rearward side of the panels 1, which can further be used for cable management purposes, such as to store excess fiber cable or slack fiber cable needed to allow the tray modules 4 to be slid out of the tray module housing 2 to be accessed.

FIG. 4 is a top view of one example of a fiber cable management panel framework 1 contemplated by the invention, with the top panel of the panel housing removed.

FIG. 4 better illustrates the components within the tray module housing 2, including the tray module 4 with the arcuate corner 7 to maintain a minimum bending radius through the front opening 13. The fiber cable adapters 9 are mounted within the tray module 4 by adapter mount 8. The front connector 10 is operatively connected to the front of adapter 9 and the rear connector 11 is operatively connected to the rear of adapter 9, thereby operatively connecting the front and rear connectors and hence the fiber optic cables 12 and 16.

The adapters 8 are mounted within the tray modules at an angle such that the connectors are more directed toward the front opening 13 in the tray modules, thereby increasing the bending radius on the fiber cable and reducing the potential harm to the fiber.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A modular fiber optic cable management panel, comprising:

a. a tray module housing;

b. a plurality of tray modules in slidable relation to the tray module housing, each tray module including an integral front tray module opening for routing one to four fiber optic cables and an integral rear tray module opening for routing one to four fiber optic cables, wherein the front tray module and the rear tray module prevent the fibers from being bent in an arc having a radius of curvature that is less than a prescribed value; and c. one to four fiber optic adapters mounted on at least one of the tray modules.

2. A modular fiber optic management panel as recited in claim 1, and in which one of the fiber optic adapters in a tray module attaches to connectors for a receive fiber optic cable and the remaining fiber optic adapter attaches to connectors for a transmit fiber optic cable.

3. A modular fiber optic management panel as recited in claim 1, and in which the ratio of fiber optic adapters to square inches of frontage area of the management panel is greater than fifty adapters per one hundred square inches.

4. A modular fiber optic management panel as recited in claim 1, and in which the tray modules can be slid out of the tray module housing to target a particular fiber cable, while-only displacing one to three other fiber cables.

5. A modular fiber optic management panel as recited in claim 1, and in which the tray module housing is less than twenty inches wide.

6. A modular fiber optic management panel as recited in claim 1, and in which two to four tray module housings can be mounted in an industry standard fiber optic distribution rack measuring approximately twenty three inches wide.

7. A modular fiber optic management panel framework, comprising:
   a. a tray module housing;
   b. a plurality of tray modules in slidable relation to the tray module housing, each tray module including an integral front tray module opening for routing one to four fiber optic cables and an integral rear tray module opening for routing one to four fiber optic cables, wherein the front tray module and the rear tray module prevent the fibers from being bent in an arc having a radius of curvature that is less than a prescribed value;
   c. one to four fiber optic adapters mounted on at least one of the tray modules;
   d. an auxiliary housing connected to the tray module housing; and
   e. one or more auxiliary trays in slidable relation to the auxiliary housing.

8. A modular fiber optic management panel as recited in claim 7, and in which the ratio of fiber optic adapters to square inches of frontage area of the management panel is greater than fifty adapters per one hundred square inches.

9. A modular fiber optic management panel framework as recited in claim 7, and which further comprises a fiber cable wrap post mounted to the auxiliary housing adjacent to the tray module housing.

10. A modular fiber optic management panel framework, comprising:
   a. a fiber optic management panel framework;
   b. a tray module housing attached to the panel framework;
   b. a plurality of tray modules in slidable relation to the tray module housing, each tray module including an integral front tray module opening for routing one to four fiber optic cables and an integral rear tray module opening for routing one to four fiber optic cables, wherein the front tray module and the rear tray module prevent the fibers from being bent in an arc having a radius of curvature that is less than a prescribed value;
   d. one to four fiber optic adapters mounted on at least one of the tray modules;
   e. an auxiliary housing connected to the panel framework; and
   f. one or more auxiliary trays in slidable relation to the auxiliary housing.

11. A modular fiber optic management panel framework as recited in claim 10, and which further comprises a fiber cable wrap post mounted to the panel framework adjacent to the tray module housing.

12. A modular fiber optic distribution system as recited in claim 10, and which further comprises one or more retaining brackets mounted to the panel framework adjacent to the tray module housing.

13. A modular fiber optic management panel as recited in claim 10, and in which the ratio of fiber optic adapters to square inches of frontage area of the management panel is greater than fifty adapters per one hundred square inches.

14. A fiber optic cable management process, comprising the following steps:
   a. providing a tray module housing;
   b. providing a plurality of tray modules in slidable relation to the tray module housing, each tray module including an integral front tray module opening for routing one to four fiber optic cables and an integral rear tray module opening for routing one to four fiber optic cables, wherein the front tray module and the rear tray module prevent the fibers from being ban in an arc having a radius of curvature that is less than a prescribed value;
   c. sliding one of the tray modules frontward from the housing;
   d. connecting a first signal transmission fiber cable to one of the fiber optic adapter connectors; and
   e. connecting a second signal transmission fiber cable to the same fiber optic adapter connector.

* * * * *